(12) United States Patent
Andersson et al.

(10) Patent No.: US 9,674,713 B2
(45) Date of Patent: Jun. 6, 2017

(54) ARRANGEMENTS AND METHODS IN COMMUNICATION NODES

(75) Inventors: Claes Andersson, Stockholm (SE); Håkan Persson, Solna (SE); Mattias Wahlqvist, Madrid (ES)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 287 days.

(21) Appl. No.: 13/501,120

(22) PCT Filed: Oct. 23, 2009

(86) PCT No.: PCT/SE2009/051219
§ 371 (c)(1),
(2), (4) Date: Apr. 10, 2012

(87) PCT Pub. No.: WO2011/049501
PCT Pub. Date: Apr. 28, 2011

(65) Prior Publication Data
US 2012/0196543 A1      Aug. 2, 2012

(51) Int. Cl.
*H04B 17/00* (2015.01)
*H04W 24/02* (2009.01)
(Continued)

(52) U.S. Cl.
CPC .......... *H04W 24/02* (2013.01); *H04B 17/309* (2015.01); *H04W 52/0203* (2013.01); *H04B 17/24* (2015.01); *H04W 24/08* (2013.01)

(58) Field of Classification Search
CPC ....... H04W 24/00; H04W 24/10; H04W 4/26; H04W 72/0493; H04W 24/02;
(Continued)

(56) References Cited

U.S. PATENT DOCUMENTS 5,423,067 A * 6/1995 Manabe ................. 455/524
6,459,695 B1 * 10/2002 Schmitt ................. 370/344
(Continued)

FOREIGN PATENT DOCUMENTS

| EP | 1655861 A2 | 5/2006 |
|----|-----------|--------|
| GB | 2395398 A | 5/2004 |
| WO | 01/13536 A1 | 2/2001 |

*Primary Examiner* — Nguyen Vo
(74) *Attorney, Agent, or Firm* — Patents on Demand P.A.; Brian K. Buchheit; Scott M. Garrett (57) ABSTRACT

The invention relates to a method in a reporting communications node (12, 14) for detecting usage of a resource within a radio access network. The reporting communication node (12, 14) is comprised within a radio communications network (1), in which radio communications network (1) a user equipment (12) is served. The reporting communications node monitors a performance measurement per user equipment of the user equipment (12), which performance measurement indicates usage of resources within a radio access network. The reporting communication node detects when the performance measurement per user equipment of the user equipment (12) goes beyond a threshold value over a preset period of time. In addition, the reporting communication node reports to a different communication node (14, 15) or within the communication node (12, 14), the performance measurement per user equipment when the performance measurement per user equipment goes beyond the threshold value.

25 Claims, 8 Drawing Sheets

(51) Int. Cl.
*H04W 52/02* (2009.01)
*H04B 17/309* (2015.01)
*H04W 24/08* (2009.01)
*H04B 17/24* (2015.01)

(58) Field of Classification Search
CPC  H04W 52/0203; H04W 24/08; H04B 17/309; H04B 17/24
USPC ......... 455/423, 424, 425, 67.11, 67.13, 67.7, 455/456.1
See application file for complete search history.

(56) References Cited

U.S. PATENT DOCUMENTS

| | | | |
|---|---|---|---|
| 6,697,378 B1* | 2/2004 | Patel | 370/468 |
| 7,856,493 B1* | 12/2010 | Pithawala et al. | 709/223 |
| 8,326,958 B1* | 12/2012 | Raleigh | G06Q 10/06375 705/30 |
| 2006/0217115 A1* | 9/2006 | Cassett et al. | 455/423 |
| 2006/0271678 A1* | 11/2006 | Jessup | G06F 1/3203 709/224 |
| 2007/0127581 A1* | 6/2007 | Connor | G06F 1/32 375/257 |
| 2009/0291692 A1* | 11/2009 | Kazmi et al. | 455/452.2 |
| 2010/0017506 A1* | 1/2010 | Fadell | 709/224 |
| 2010/0190469 A1* | 7/2010 | Vanderveen et al. | 455/406 |
| 2010/0211681 A1* | 8/2010 | Chan et al. | 709/226 |
| 2011/0044182 A1* | 2/2011 | Herriott et al. | 370/252 |
| 2012/0184315 A1* | 7/2012 | Oteri et al. | 455/509 |
| 2012/0289248 A1* | 11/2012 | Stamoulis et al. | 455/456.1 |
| 2013/0242776 A1* | 9/2013 | Kazmi et al. | 370/252 |

\* cited by examiner

ARRANGEMENTS AND METHODS IN COMMUNICATION NODES

TECHNICAL FIELD

This invention relates to an arrangement and a method in a reporting communication node and a method and an arrangement in a receiving communication node, in particular, for detecting usage of a resource within a radio access network.

BACKGROUND

In today's radio communications networks where Mobile Broadband (MBB) is implemented, the traffic distribution between users is, and will be, very uneven. According to telecom analysts, typically 90% of the generated traffic is performed by 10% of the users. User equipments used within these networks are mainly Laptop modems, which have a nomadic or fixed behaviour and the traffic is mainly generated indoor. Data from real network shows also that the heavy MBB load in the radio communication network is often created in suburban areas, where "home" usage is dominating.

The radio communications network design in such areas is almost always built as a macro cell network with as reasonably large coverage area per cell/sector since there are e.g. small amount of offices in such areas. The radio communications network is traditionally built for voice services with a relatively low load. With adoption of MBB as a Digital Subscriber Line (DSL) replacement/complement in the homes, drastic changes of the traffic volumes per sector/cell start to happen.

In particular indoor environments there are a large variation of signal quality depending on the placement of a user equipment antenna. When a user equipment consumes a lot of Megabit traffic with a high data rate connection, a lot of system resources such as transmit power, time slots and frequencies can be allocated from the base station to that user equipment. The amount of resources used is mainly based upon bit rate and the signal quality of the connection. This means that a user equipment with bad signal quality can consume much more system resources than one with good quality, to obtain the same bit rate. In other words, some users cost much more than others while doing the same thing.

SUMMARY

An object of the embodiments herein is to provide a mechanism to use resources in a radio communications network in an efficient manner.

According to a first aspect a method in a reporting communication node is provided. The method is for detecting usage of a resource within a radio access network. The reporting communication node is comprised in a radio communications network, in which a user equipment is served.

The reporting communication node monitors a performance measurement per user equipment of the user equipment. The performance measurement indicates usage of the resource within the radio access network. The reporting communication node further detects when the performance measurement per user equipment goes beyond a threshold value over a preset period of time. The threshold value is set to indicate an over-use of the resource within the radio access network. The reporting communication node then reports, to a receiving communication node or within the reporting communication node, the performance measurement per user equipment when the performance measurement per user equipment goes beyond the threshold value.

In order to perform the method an arrangement in the reporting communication node is provided. The arrangement comprises a monitoring unit arranged to monitor a performance measurement per user equipment of the user equipment, which performance measurement indicates usage of the resource within the radio access network. The arrangement further comprises a detecting unit arranged to detect when the performance measurement per user equipment of the user equipment goes beyond the threshold value over the preset period of time. The arrangement additionally comprises a reporting unit arrange to report, to a receiving communication node or within the reporting communication node, the performance measurement per user equipment when the performance measurement per user equipment goes beyond the threshold value.

According to a second aspect a method in a receiving communication node is provided. The method is for determining a usage of a resource in a radio access network; which receiving communication node is comprised within a radio communications network. The radio communications network serves the user equipment. The receiving communication node receives, from the reporting communication node or from within the receiving communication node, a report of a performance measurement per user equipment associated to the user equipment. The report indicates the performance measurement per user equipment in relation to a threshold value, which threshold value is set to indicate an over-use of the resource within the radio access network. The receiving communication node determines that the usage of the resource is an over-use when performance measurement per user equipment goes beyond the threshold value over a preset time period.

In order to perform the method an arrangement in the receiving communication node is provided. The arrangement comprises a receiving unit arranged to receive, from the reporting communication node or from within the receiving communication node, the report of a performance measurement per user equipment associated to the user equipment. Furthermore, the arrangement comprises a determining unit arranged to determine that the usage of the resource is an over-use when performance measurement per user equipment goes beyond the threshold value over a preset time period.

When it comes to individual users, e.g. heavy MBB users, the present technology enables the implementation of a detection mechanism of resource usage of the user equipment without having the geographical location of the user equipment. Some of the user equipments in the radio communications network are served with a reasonable resource allocation in the radio network and the others that cost much more than an operator earn may be detected. Hence, individual solutions may be implemented to take care of these other user equipments. From an operator perspective, individual solutions as femto, repeater or relays may become much more cost efficient than occupying a large resource portion of a cell/sector capacity. Thus, resources may be used in an efficient manner.

BRIEF DESCRIPTION OF THE DRAWINGS

Embodiments will now be described in more detail in relation to the enclosed drawings, in which.

DETAILED DESCRIPTION

Figure 1:
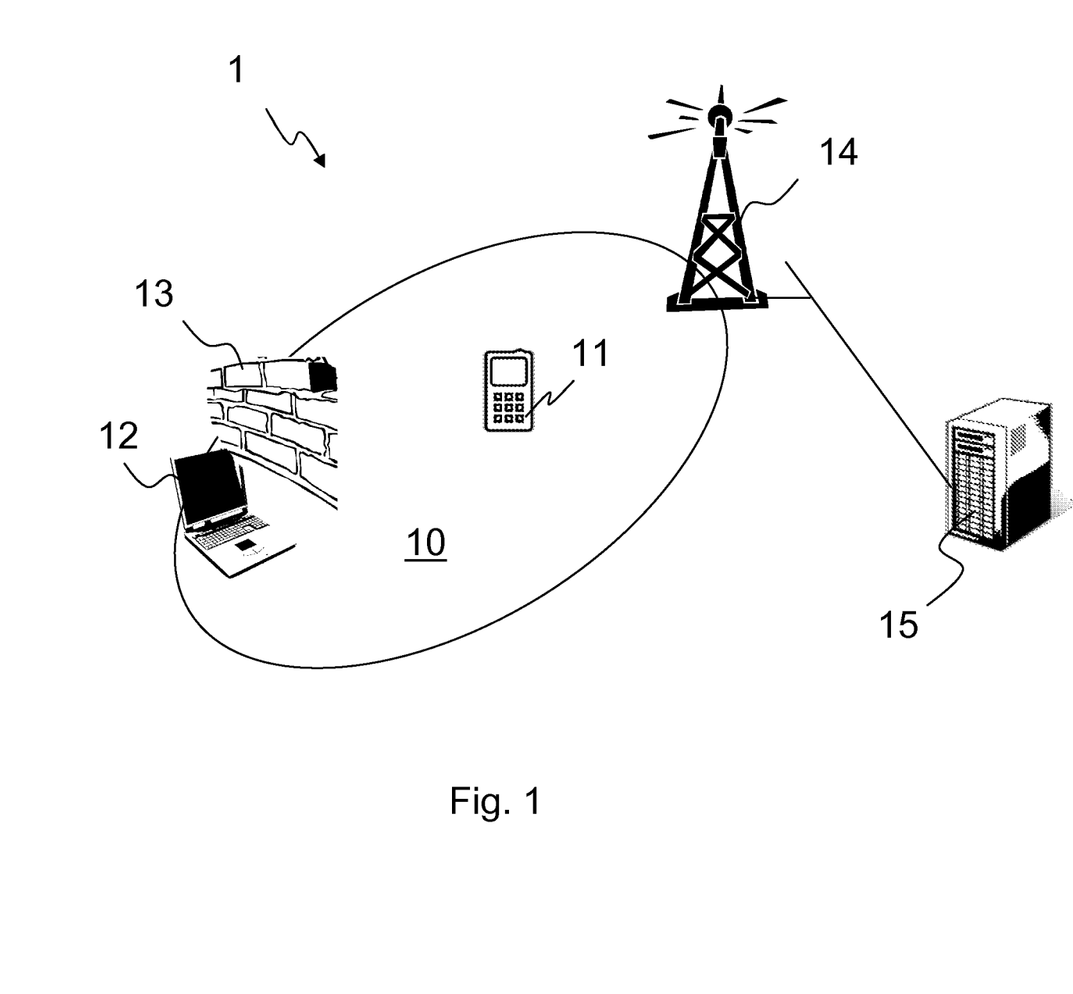
FIG. 1 is a schematic diagram of a radio communications network.

FIG. 1 shows an example of a radio communications network 1 in which the present invention is suitably applied. As shown, the radio communications network 1 is a cellular system and comprises a number of cells, one of which is shown as a cell 10 in FIG. 1. Each cell may comprise a number of user terminals, with the generic name "UE", User Equipment, two of which are shown as a first user equipment 11 and a second user equipment 12 within the cell 10 in FIG. 1. The first user equipment 11 is exemplified as a mobile phone and the second user equipment 12 is exemplified as a portable computer used close to the cell border and behind a brick wall 13 of a house.

For each cell in the radio communications network 1, there is a controlling node, generically referred to as a "radio base station", RBS, which is shown as 14 in FIG. 1. One role of the RBS 14 is that all traffic to and from the user equipments 11 and 12 in the cells 10 is routed via the RBS 14. The telecommunications network 1 may comprise a Long Term Evolution (LTE) network as well as other networks such as Wideband Code Division Multiple Access (WCDMA), Global System for Mobile communications (GSM) or the like. An RBS may be denoted as NodeB or eNodeB in some of the networks.

In the example, a Radio Access Network (RAN) node 14, such as an Radio Network Controller (RNC) or a radio base station in 3G systems and a radio base station in LTE, and the user equipment 12 may monitor/detect high usage for example, throughput or volume, on a user level. The radio access network node 14 may also signal or report to an Operation and Maintenance (O&M) centre 15 when unacceptable level of resource utilization occurs, and if needed include information where the user equipment 12 is located within a cell. There may also be possibilities to trace individual user equipments on the resource utilization in fault situations, e.g. where the end user complains about low performance or the operator wants to investigate cause for bad cell/user performance. In addition, it is also possible to trigger a user to use other frequency bands and/or radio interfaces technology during the connection if this will make the use of overall system resource usage better, decreasing the system resource utilization. This is constrained to the capabilities of the user equipment 12. It should be noted that the user equipment 12 and the radio access network node 14 may be called a reporting communication node and similarly may the radio access network node 14 and the O&M centre 15 be called reporting communication node depending on the structure of the reporting process.

Today there are a number of alternative solutions to increase performance and/or capacity, such as the introduction of smaller cells, Femto alternatives, Repeater/Relays, and fixed wireless access, that is, fixed antennas and by detecting when and where a particular solution is needed, an optimal solution may be efficiently provided.

The radio access network node 14 monitors the usage of system resources on an individual user equipment level and checks the usage against settable value ranges for the type of usage. The usage of a resource is defined as a performance measurement per user equipment parameter. The radio access network node 14 may, when the used resource is above a threshold value, send a message to the O&M centre 15. Examples of information found in the message are: Information about the user equipment identity, such as temporary mobile subscriber identity (TMSI), International Mobile Subscriber Identity (IMSI) if available, used system resource and limits, such as traffic volume, number of retransmissions, etc, and, if available, information related to the location of the user equipment, such as cell information, beam, position coordinates etc.

The report may be sent from the radio access network node 14 to the O&M centre 15, but it might also be possible to send the report via a Core Network (CN) in which additional information may be added, for example, mapping TMSI to IMSI. In some embodiments, the O&M centre 15, when receiving the report from radio access network node 14, makes a request to the CN about additional information.

The user equipment 12 may also initiate a report by informing about problems and high usage like power levels, received and sent data, intensity of a neighbouring cell measurement, a high level of re-transmissions etc. The user equipment 12 may include geographical position in the report to be used, for example, Global Positioning system (GPS) coordinates. If deemed necessary, the radio access network node 14 may also use the opportunity to change the actual frequency band used in the user equipment connection reducing the amount of used radio resources immediately. This may be the case since e.g. the location of the radio base station in a new Radio Access Technology (RAT) used is more favourable located.

Examples of detection mechanisms to trigger the above mentioned procedures may be:

Detection and monitoring may be based on performance measurements, for example, measured by counters, in the radio access network node 14 or the user equipment 12.

Detection and monitoring may be performed per user equipment, with the purpose to identify which UEs that consume an unreasonable amount of resources.

Additional information may be collected for UEs that do consume unreasonable amount of resources, examples may be:

Logging of temporary identifiers for the purpose of identifying the user subscription;

Positioning of the user equipment which may be done roughly, such as cell/sector/beam/timing, or more exact by means of positioning functionality;

Performing Deep Packet Inspection (DPI) may be performed for the purpose of identifying which type of services the user equipment 12 uses, for example, voice of IP, file transfer or the like;

Tracing may also be initiated for the user equipment 12 in order to better analyse the behaviour of the UE user equipment, and for fault detection purposes.

For example, when a misuse is detected, this is used as a trigger point for investigate the nature of the usage e.g. DPI.

Figure 2:
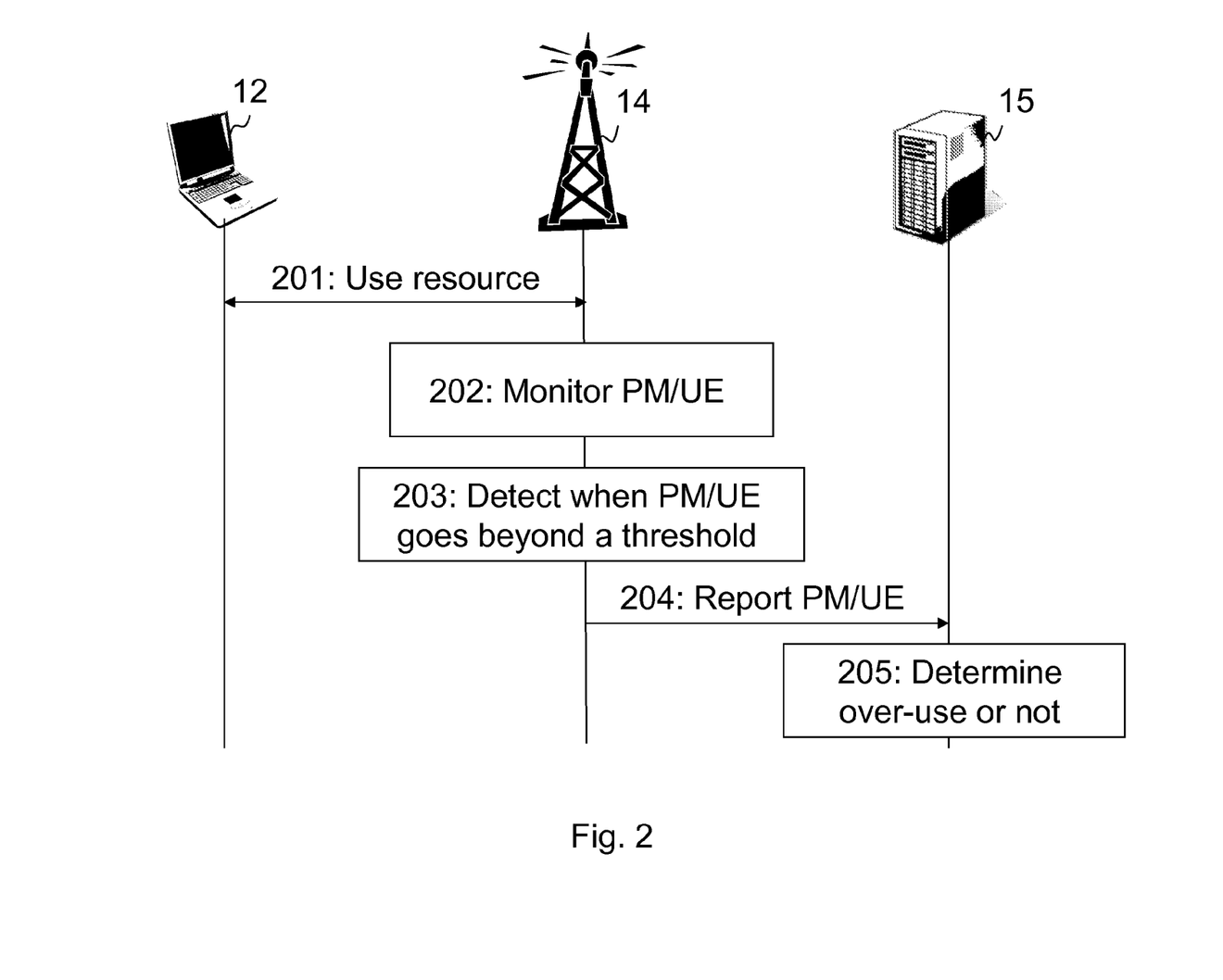
FIG. 2 is a schematic combined signaling and method flowchart in a radio communications network.

In FIG. 2 a schematic overview of combined signaling and method flowchart in a radio communications network is shown. A monitoring process is exemplified in the radio access network node 14 but may also be performed in the user equipment 12. The method comprises the following steps that may be taken in any suitable order. In the illustrated example the radio access network node 14 comprises a radio base station.

Step 201. The user equipment 12 uses a resource or an amount of resources of the radio access network. The user equipment 12 may be used as a stationary or semi stationary computer at home, wherein the user equipment 12 is intensely using a resource or resources, for example, by performing high data rate transfers, use a high level of transmission power, use resources at a location wherein the user equipment 12 has poor transmission performance or the like.

Step 202. The radio access network node 14, such as e.g. a radio base station, monitors the resource used by the user equipment 12. This is performed by monitoring a performance measurement per user equipment. The performance measurement per user equipment may be received from the user equipment 12 or a different communication node, such as a radio base station when the radio access network node 14 is represented by a radio base station controller or a second radio base station when the communications node is represented by a first radio base station. The performance measurement per user equipment may also be measured within the radio access network node 14.

Step 203. The radio access network node 14 detects when the performance measurement per user equipment goes beyond a preset threshold value over a preset period of time. The preset period of time is set to exclude that the user equipment 12 that has a short temporary performance dip based on movement or the like. For example, the period may be set to seconds, minutes or even longer. The threshold value is set to indicate an over-use, in other words excessive use or over-consumption, of the resource within the radio access network. The radio access network node 14 may also determine position of the user equipment 12 based on a user equipment GPS report, a report of cell position from a radio base station or radio base station controller to the O&M centre 15.

Step 204. The radio access network node 14 reports, when the performance measurement per user equipment has gone beyond the threshold value. For example, when the number of dropped calls, used bandwidth exceeds the preset threshold value or when the data rate goes below a preset threshold value. The report may be signaled to the O&M centre 15, but may also be signaled to a radio base station controller or a radio base station, when performed within the user equipment 12. The report may also be signaled internally within the radio access network node 14.

Step 205. The O&M centre 15 receives the report and determines the over usage of the user equipment 12 based on the report. The O&M node 15 may then perform a number of counter measures based on the report such as adjustment of a power setting, change an antenna directions, an antenna tilt, and/or change RAT. The counter measures may be determined by an operator of the radio communications network, such as deciding to increase the number of nodes in the network by adding one or more base stations, moving the antenna closer to the user equipment 12, for instant main-remote and distributed antenna solutions, adding more advanced antenna systems, offering the problematic users a work around solution, such as femto, repeater/relay/fixed broadband nodes, or terminating the subscription when detecting misuse/abuse.

By this technique it is possible for an operator to detect the small part of users, which consume an unreasonable amount of a network resource. By doing such identification, the operator may make his network operation more cost efficient, as he may direct and focus his improvement actions towards that small amount of users instead of taking action on a more general level. The purpose is to identify the small amount of users and assist users that either are less cost efficient in terms of utilized system resources or in fault situations where e.g. an unfortunate placement of the antenna causes either bad performance and/or an exaggerated usage of the resources. Since both the user and the "use case" are detected by the operator, the best solution may therefore be suggested and/or applied. Due to the traffic growth in mobile broadband and build out in a number of "new" frequency bands with different coverage properties, it is expected that the need for this type of functionality will increase.

Figure 3:
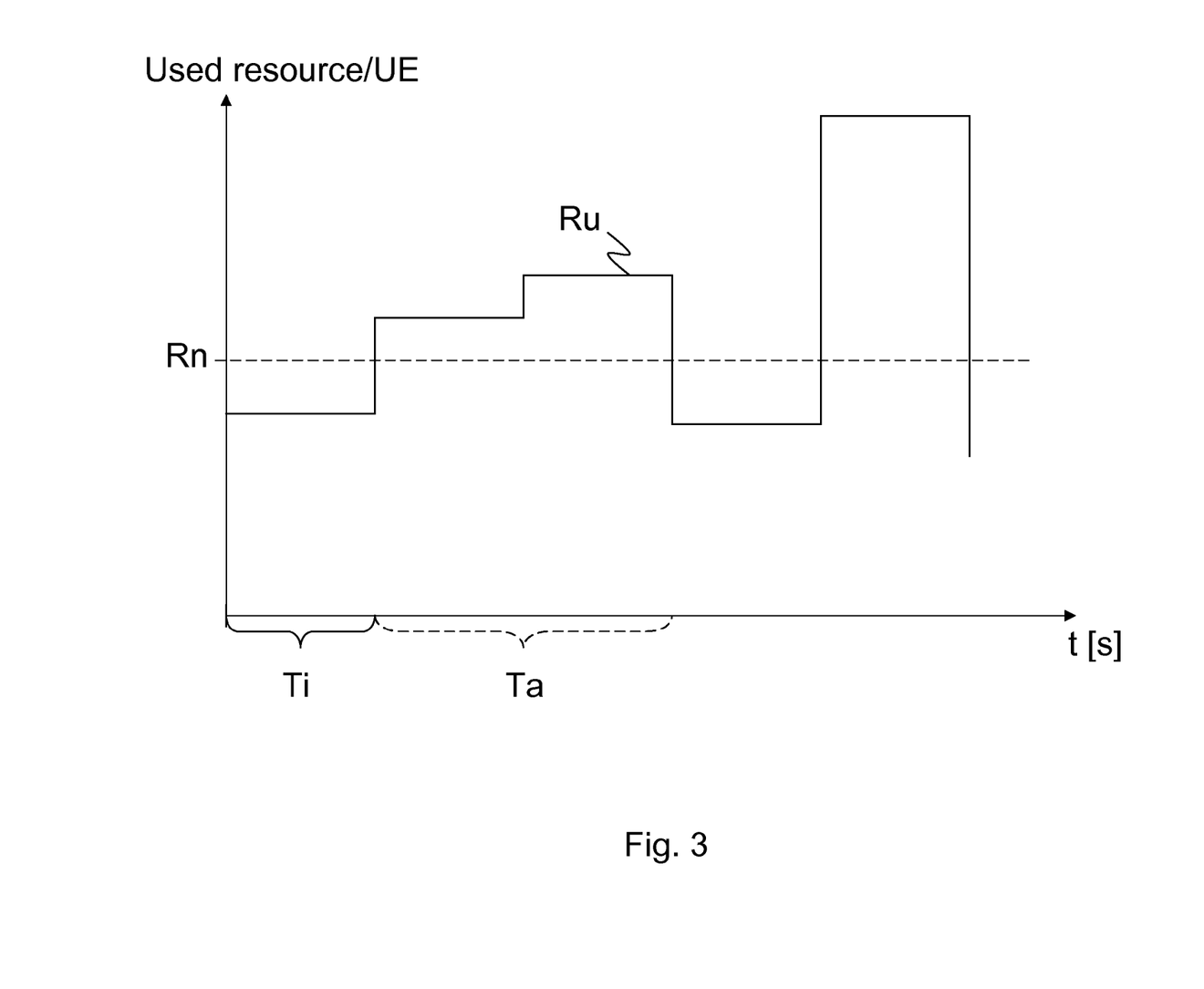
FIG. 3 is a schematic graph of resources used over time.

FIG. 3 shows a graph of used resources of a user equipment in relation to time. A normal usage of a resource is indicated as a dashed line denoted as Rn. The actual amount of the resource used of the user equipment 12 is indicated in a line denoted as Ru. The actual resources used are reported/monitored over period of time denoted as a time interval Ti. Ti may be in the range of 1-100 s. The above mentioned performance measurement per user equipment may be defined as used resources of the radio access network, and the threshold may be preset as a value of a quotient of used resources compared to normal usage of resources.

Hence, in the illustrated example a threshold value may be preset as $Ru/Rn \leq 1,1$ over 2 Ti. That means, the actual resource usage should not be over 10% of the normal usage over a period of 2 Tis.

In the example, the actual amount of resource used Ru exceeds the Rn over a period of 2 Tis, denoted as alarm time Ta, and hence this Ru will generate an alarm. The alarm may be sent internally or to a different communication node.

Then based on the alarm a counter measure may be performed such as change RAT, add antenna, terminate service and/or the like.

A message comprising the alarm may comprise an indication of an absolute level of the resource usage, what service used, quotient between usefulness and used resource.

Figure 4:
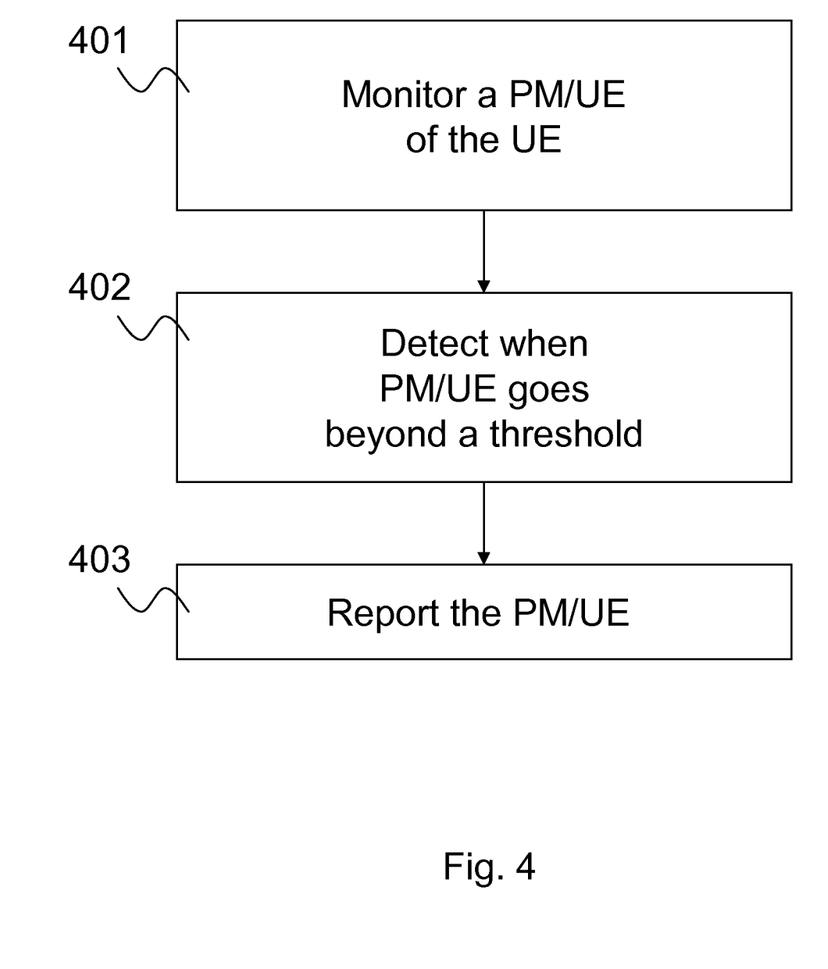
FIG. 4 is a schematic flowchart of a method in a reporting communication node.

The method steps in the communication node, referred to as reporting communication node 12 or 14 in the figures, for detecting usage of a resource within a radio access network according to some general embodiments will now be described with reference to a flowchart depicted in FIG. 4. The steps do not have to be taken in the order stated below, but may be taken in any suitable order.

Step 401. The reporting communication node 12,14 monitors a performance measurement per user equipment (PM/UE) of the user equipment 12, which performance measurement indicates usage of the resource within the radio access network. Hence, the user equipment 12 may monitor itself or a radio base station or a radio base station controller may monitor the performance measurement.

Step 402. The reporting communication node 12,14 detects when the performance measurement per user equipment of the user equipment 12 goes beyond a threshold value over a preset period of time. The threshold value is set to indicate an over-use of the resource within the radio access network.

Step 403. The reporting communication node 12,14 reports the performance measurement per user equipment when the performance measurement per user equipment goes beyond the threshold value. In the case the reporting communication node is represented by the user equipment 12 the performance measurement per user equipment is reported to the radio base station or the radio base station controller. In the case the reporting communication node comprises a radio base station the performance measurement per user equipment may be reported to the radio base station controller, the operation and maintenance node 15, or internally to a processor in the radio base station. The same applies for when the reporting communication node is represented by a radio base station controller. The reporting may comprise to signal a report to the receiving communication node 14,15 or within the reporting communication node 12,14. The report may be an alarm or be polled by the receiving communication node.

Figure 5:
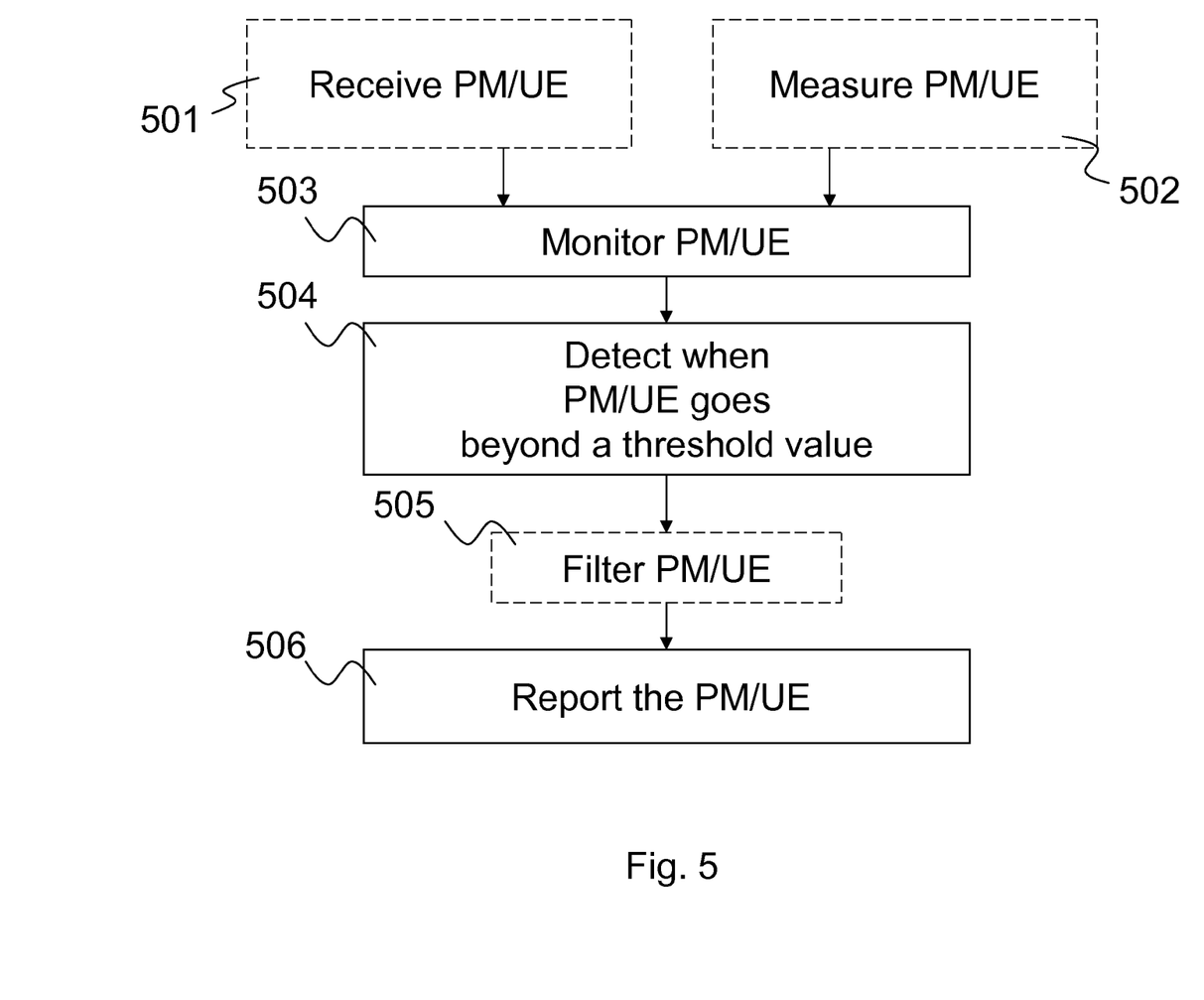
FIG. 5 is a schematic flowchart of a method in a reporting communication node.

The method steps in the reporting communication node 12,14 for detecting usage of the resource within the radio access network according to some further embodiments will now be described with reference to a flowchart depicted in FIG. 5. The steps do not have to be taken in the order stated below, but may be taken in any suitable order.

Step 501. This is an optional step as indicated with the dashed box. The reporting communication node receives a performance measurement per user equipment from the user equipment 12 when the reporting communication node is represented by a radio base station or a radio base station controller. The reporting communication node represented by a radio base station controller may also receive the performance measurement per user equipment from the radio base station. The reporting communication node may receive performance measurements from more than one radio access network node, such as a neighbouring node that supplies relevant information for the performance measurement.

Step 502. This is an optional step as indicated with the dashed box. The reporting communication node 12,14 may instead measure the performance measurement per user equipment. This may be performed in user equipment, a radio base station or a radio base station controller. Thus, the communication node may perform throughput measurement per user equipment, power consumption measurement per user equipment or the like.

Step 503. The reporting communication node 12,14 monitors the performance measurement per user equipment (PM/UE) of the user equipment 12, which performance measurement indicates usage of the resource within the radio access network. Step 503 in FIG. 5 corresponds to the step 401 in FIG. 4.

Step 504. The reporting communication node 12,14 detects when the performance measurement per user equipment of the user equipment 12 goes beyond a threshold value over a preset period of time. The threshold value is set to indicate an over-use of the resource within the radio access network. Step 504 in FIG. 5 corresponds to the step 402 in FIG. 4

Step 505. This is an optional step as indicated with the dashed box. The reporting communication node 12,14 filters out the performance measurement per user equipment according to a filter parameter. The filter parameter may be preset in the reporting communication node 12,14. For example, a performance measurement may be "used energy per bit" that is compared to "normal energy per bit" and a filter parameter may comprise a preset time period. Thus, values that exceed a preset quotient value over the preset time period trigger an alarm. Other measurements not lasting over the preset period of time are filtered out. It should be understood that a filtering process may, additionally or alternatively, be performed in a different communication node such as a the receiving communication node 14,15.

Step 506. The reporting communication node 12,14 reports the performance measurement per user equipment when the performance measurement per user equipment goes beyond the threshold value. Step 506 in FIG. 5 corresponds to the step 403 in FIG. 4. In some embodiments, the reporting communication node 12,14 reports via a core network node.

The reporting communication node 12,14 may be represented by the user equipment 12. In some embodiments, the reporting communication node 12,14 is represented by a radio access network node 14, such as a radio base station or a radio base station controller.

The performance measurement per user equipment may relate to, for example, a transmission power level, an intensity of signal measurements of a neighbouring cell, a level of retransmissions, frequencies used, resource blocks used, and/or scheduling types.

In some embodiments, the reporting communication node 12,14 logs a temporary identifier of the user equipment 12, a position of the user equipment 12, a type of service used by the user equipment 12, and/or behaviour of the user equipment 12.

In some embodiments, the performance measurement is defined as a used resource of the radio access network, and the threshold is preset as a value of a quotient of the used resource compared to a normal usage of the resource.

Figure 6:
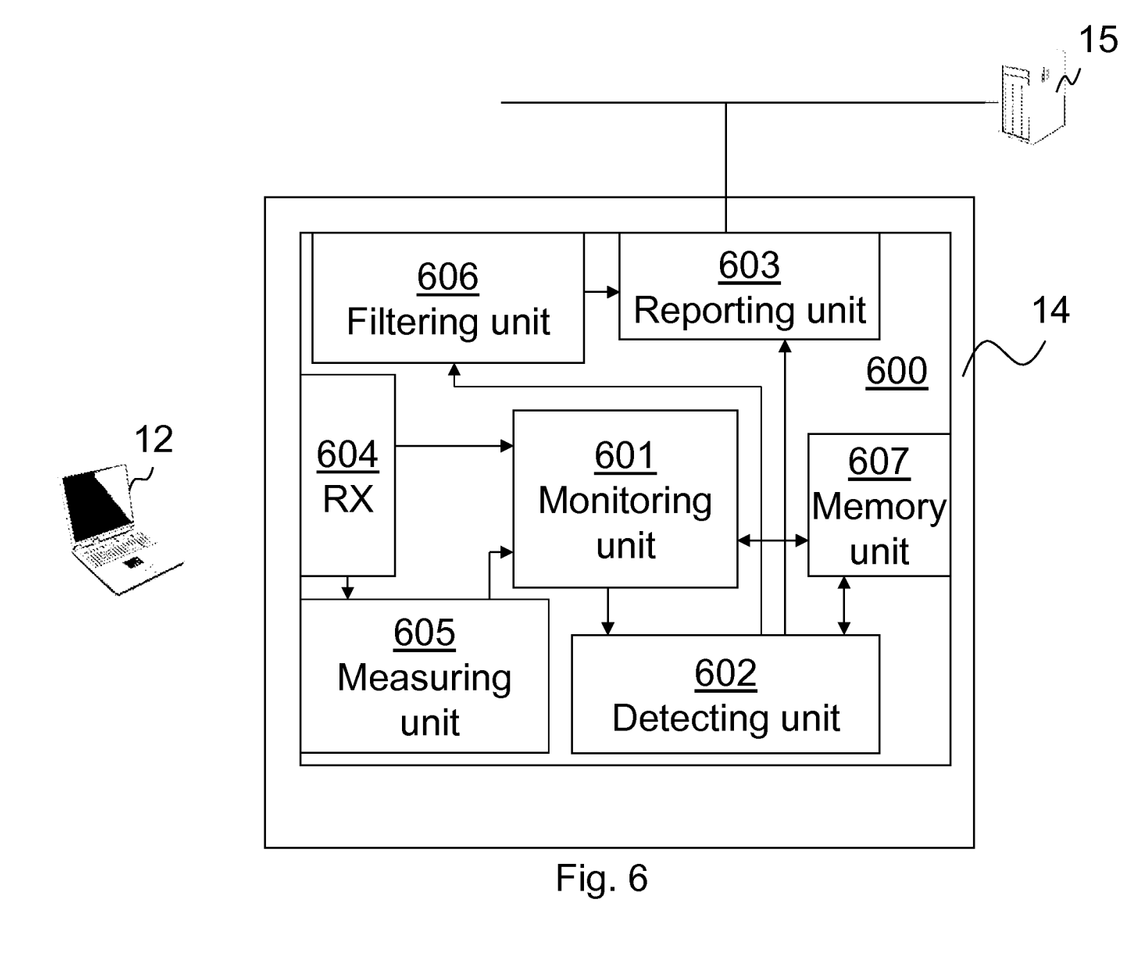
FIG. 6 is a schematic block diagram of a reporting communications node.

In order to perform the method an arrangement 600 in the reporting communication node 12,14 is provided. FIG. 6 is a schematic block diagram depicting the arrangement 600 in the reporting communication node 12,14.

The arrangement 600 comprises a monitoring unit 601 arranged to monitor a performance measurement per user equipment of the user equipment 12. The performance measurement indicates usage of the resource within the radio access network. Furthermore, the arrangement 600 comprises a detecting unit 602 arranged to detect when the performance measurement per user equipment of the user equipment 12 goes beyond a threshold value over a preset period of time. The threshold value is set to indicate an over-use of the resource within the radio access network. Additionally, the arrangement 600 comprises a reporting unit 603, arranged to report, to a receiving communication node 14,15 or within the reporting communication node 12,14, the performance measurement per user equipment when the performance measurement per user equipment goes beyond the threshold value.

In some embodiments, the arrangement 600 further comprises a receiving unit 604 arranged to receive the performance measurement per user equipment associated with the user equipment 12.

In some embodiments, the arrangement 600 comprises a measuring unit 605 arranged to measure the performance measurement per user equipment associated with the user equipment 12.

In some embodiments, the arrangement 600 further comprises a filtering unit 606 arranged to filter the performance measurement per user equipment associated with the user equipment according to a filtering parameter. Furthermore, the arrangement 600 may further comprise a memory unit 607 arranged to store data thereon such as filtering parameters, threshold values and the like.

The reporting communication node is represented by a radio access network node 14, such as a radio base station or a radio base station controller in the illustrated example, but may also be represented by the user equipment 12.

Figure 7:
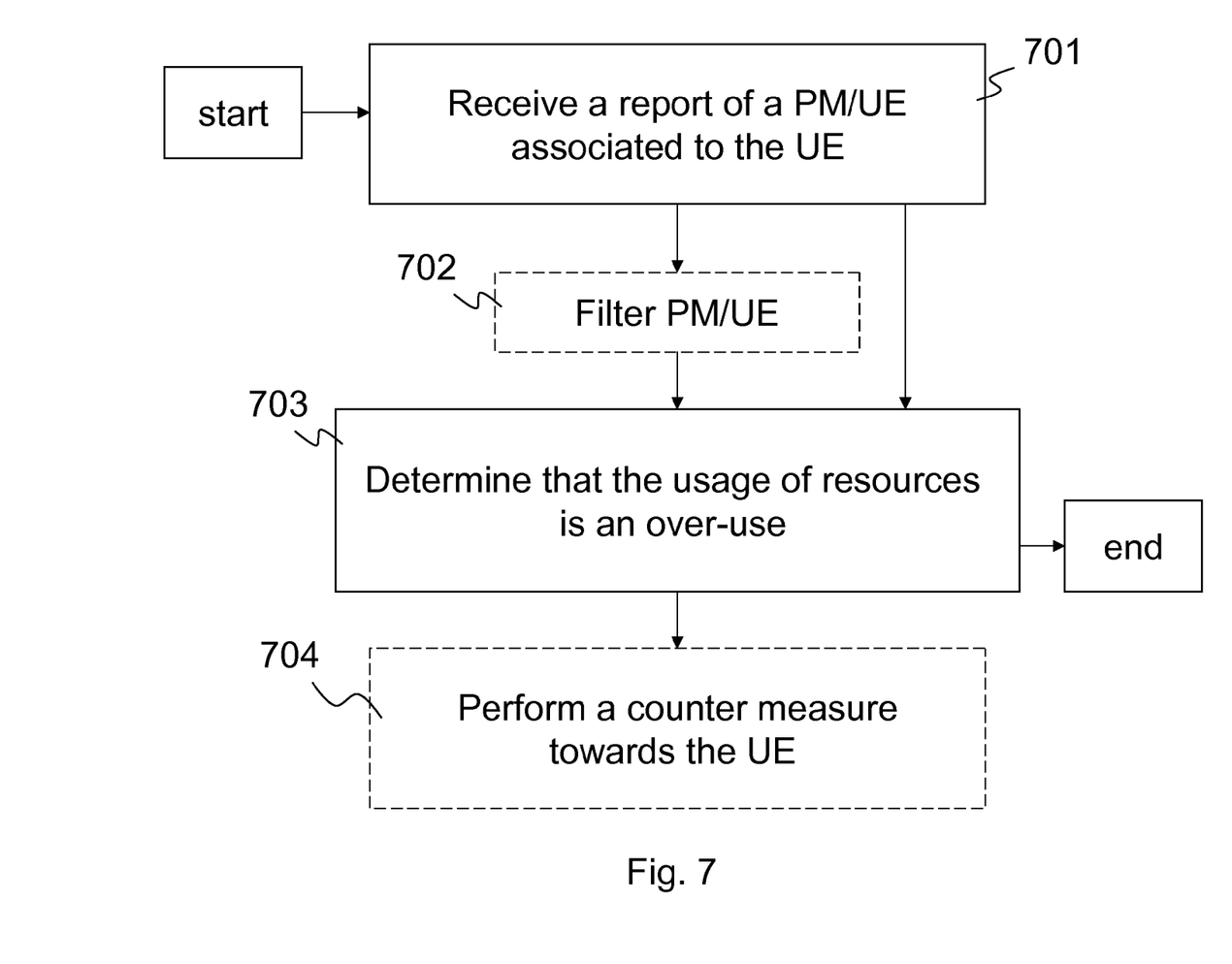
FIG. 7 is a schematic flowchart of a method in a receiving communication node.

The method steps in the receiving communication node, referred to as receiving communication node 14,15 in the figures, for determining a usage of a resource in a radio access network according to some general embodiments will now be described with reference to a flowchart depicted in FIG. 7. The steps do not have to be taken in the order stated below, but may be taken in any suitable order. The receiving communication node is 14,15 is comprised within the radio communications network, in which the user equipment 12 is served.

Step 701. The receiving communication node 14,15 receives, from a reporting communication node 12,14 or from within the receiving communication node 14,15, a report of a performance measurement per user equipment associated to the user equipment 12. The report indicates the performance measurement per user equipment in relation to a threshold value, which threshold value is set to indicate an over-use of the resource within the radio access network.

In some embodiments, the report comprises additional information about the user equipment 12, related to geographical position, identity, subscription property, service property or the like.

Step 702. This is an optional step as indicated with the dashed line. The receiving communication node 14,15 filters the performance measurement per user equipment associated with the user equipment 12 according to a filtering parameter.

Step 703. The receiving communication node 14,15 determines that the usage of the resource is an over-use, in other words, excessive use, an overconsumption, when performance measurement per user equipment goes beyond the threshold value over a preset time period. The threshold may be set monitoring usage over a period of time and based on that determine the threshold value to indicate an over-use.

Step 704. This is an optional step as indicated with the dashed line. The receiving communication node 14,15 performs a counter measure towards the user equipment based on the received report.

In some embodiments, the counter measure comprises, decision to increase the number of nodes in the network by adding one or more base stations, femto base stations, repeaters; an adjustment of a power setting; an antenna direction, and a tilt; moving the antenna closer to the user; for instant main-remote and distributed antenna solutions; adding more advanced antenna systems; offering the problematic users a work around solution or the like. This may be performed by an analysing program running on the receiving communication node. This may also be performed manually by an operator or the like.

The method may be initiated by an operator sending out a request to determine over-use of resources.

The receiving network communication node is represented by an operation and maintenance node 15, a radio base station or a radio base station controller 14.

Figure 8:
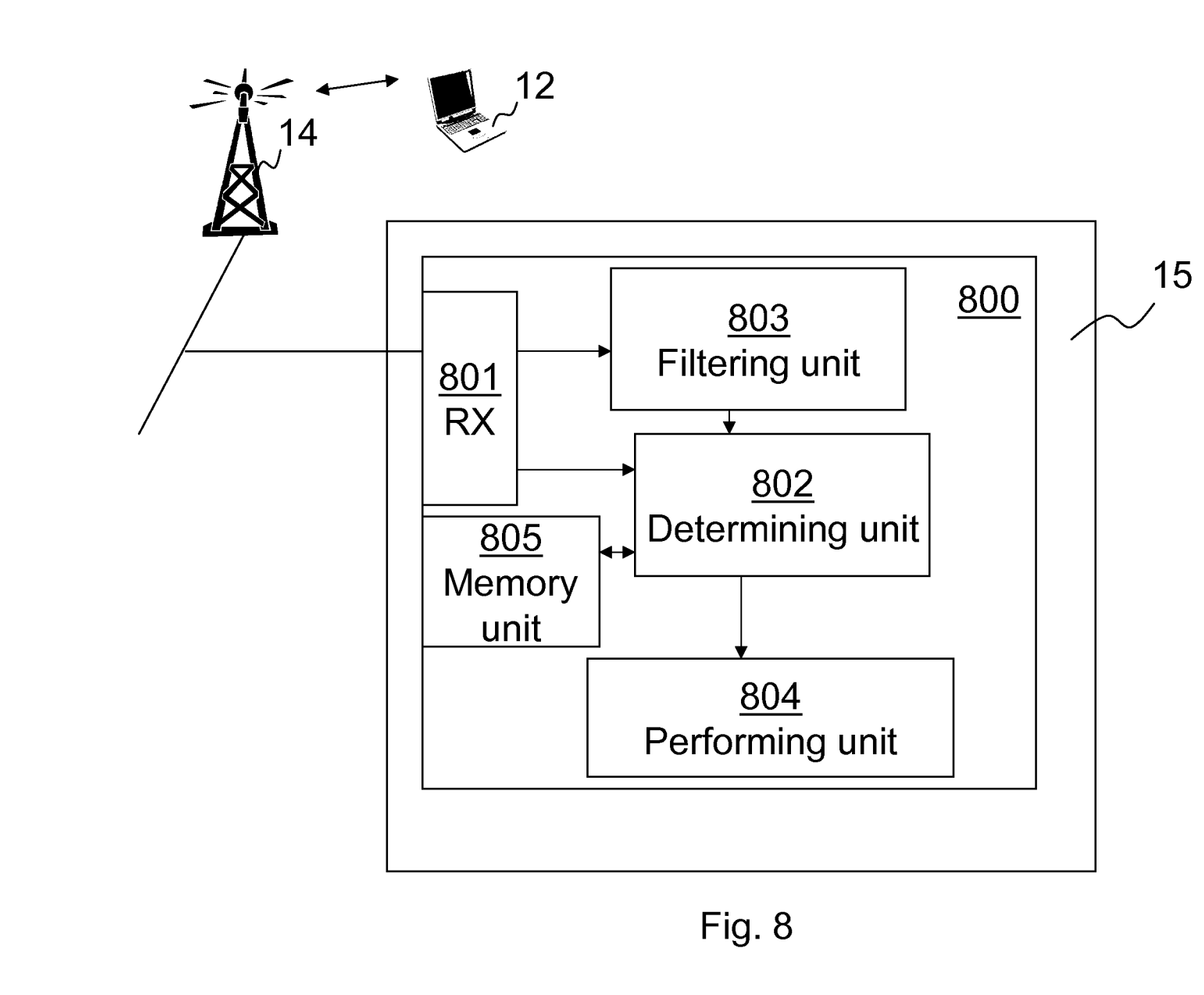
FIG. 8 is a schematic block diagram of a receiving communication node.

In order to perform the method an arrangement in the receiving network communication node 14,15 is provided. FIG. 8 shows a schematic block diagram of the arrangement 800 in a receiving communication node being represented by an Operation and Maintenance centre 15. The arrangement 800 comprises a receiving unit (RX) 801 arranged to receive, from a reporting communication node or from within the receiving communication node, the report of the performance measurement per user equipment associated to the user equipment 12. The report indicates the performance measurement per user equipment in relation to a threshold value, which threshold value is set to indicate an over-use of the resource within the radio access network. The arrangement 800 further comprises a determining unit 802 arranged to determine that the usage of the resource is an over-use when performance measurement per user equipment goes beyond the threshold value over a preset time period.

The arrangement 800 may further comprise a filtering unit 803 arranged to filter the performance measurement per user equipment associated with the user equipment 12 according to a filtering parameter. The arrangement may, in some embodiments, comprise a performing unit 804 arranged to perform a counter measure towards the user equipment based on the received report.

Furthermore, the arrangement 800 may further comprise a memory unit 805 arranged to store data thereon such as filtering parameters, threshold values and the like.

In the drawings and specification, there have been disclosed exemplary embodiments of the invention. However, many variations and modifications may be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a reporting communication node for detecting usage of a resource within a radio access network, which reporting communication node is comprised within a radio communications network in which a user equipment is served, the method comprising:

monitoring a performance measurement per user equipment of the user equipment in a connection, which performance measurement indicates usage of the resource within the radio access network per bit;

defining a resource usage threshold value per bit for the user equipment for a type of usage;

detecting when the performance measurement per user equipment of the user equipment goes beyond the resource usage threshold value per bit over a preset period of time, which the resource usage threshold value per bit is set to indicate an over-use by the user equipment of the resource within the radio access network for the defined bit rate, wherein the preset period of time is set to exclude that the user equipment can have a short temporary performance dip based on movement of the user equipment; and reporting, to a receiving communication node or within the reporting communication node, the performance measurement per user equipment when the performance measurement per user equipment goes beyond the resource usage threshold value per bit.

2. The method of claim 1, further comprising receiving the performance measurement per user equipment associated with the user equipment.

3. The method of claim 1, further comprising measuring the performance measurement per user equipment associated with the user equipment.

4. The method of claim 1, further comprising filtering the performance measurement per user equipment associated with the user equipment according to a filtering parameter.

5. The method of claim 4, wherein the filtering parameter is preset in the reporting communication node.

6. The method of claim 1, wherein the reporting communication node is the user equipment.

7. The method of claim 1, wherein the reporting communication node is a radio access network node.

8. The method of claim 1, wherein the performance measurement relates to at least one of: a transmission power level, an intensity of signal measurement of a neighboring cell, a level of retransmissions, frequencies used, resource blocks used, and scheduling types.

9. The method of claim 1, wherein the step of reporting comprises reporting via a core network node.

10. The method of claim 1, further comprising collecting at least one of: logged temporary identifiers of the user equipment, positions of the user equipment, type of services used by the user equipment, and behavior of the user equipment.

11. The method of claim 1, wherein the performance measurement is defined as a used resource of the radio access network, and the resource usage threshold is preset as a value of a quotient of the used resource compared to normal usage of the resource.

12. The method of claim 1, wherein the method is initiated by an operator sending out a request to determine over-use of the resource.

13. The method of claim 1, wherein the report comprises additional information about the user equipment, related to at least one of: geographical position, identity, subscription property, service property.

14. The method of claim 1, wherein the receiving network communication node is an operation and maintenance node.

15. The method of claim 1, wherein the receiving network communication node is a radio base station or a radio base station controller.

16. A method in a receiving communication node for determining a usage of a resource in a radio access network, which receiving communication node is comprised within a radio communications network in which a user equipment is served, the method comprising:
receiving, from a reporting communication node or from within the receiving communication node, a report of a performance measurement per user equipment associated to the user equipment, which report indicates the performance measurement per user equipment in relation to a energy usage threshold value per bit that is set to indicate an over-use by the user equipment of the resource within the radio access network; and
determining that the usage of the resource is an over-use when performance measurement per user equipment goes beyond the energy resource usage threshold value per bit over a preset time period, wherein the preset period of time is set to exclude that the user equipment can have a short temporary performance dip based on movement of the user equipment; and
analyzing the user equipment to determine a cause for the over-use, wherein the reporting communication node is a radio access network node.

17. The method of claim 16, further comprising filtering of the performance measurement per user equipment associated with the user equipment according to a filtering parameter.

18. The method of claim 16, further comprising performing a counter measure towards the user equipment based on the received report.

19. The method of claim 18, wherein the counter measure comprises at least one of the following: a decision to increase the number of nodes in the network by adding one or more base stations, femto base stations, repeaters, or a combination thereof; an adjustment of power settings, antenna directions, or tilts, or a combination thereof; moving the antenna closer to the user; for instant main-remote and distributed antenna solutions, adding more advanced antenna systems; and offering the problematic users a work around solution.

20. The method of claim 16, wherein the method is initiated by an operator sending out a request to determine over-use of the resource.

21. The method of claim 16, wherein the report comprises additional information about the user equipment, related to at least one of: geographical position, identity, subscription property, or service property.

22. The method of claim 16, wherein the receiving network communication node is represented by an operation and maintenance node.

23. The method of claim 16, wherein the receiving network communication node is represented by a radio base station or a radio base station controller.

24. An arrangement in a reporting communication node for detecting usage of a resource within a radio access network, which reporting communication node is comprised within a radio communications network in which a user equipment is served, the arrangement comprising;
a monitoring unit arranged to monitor a performance measurement per user equipment of the user equipment, which performance measurement indicates usage of the resource per bit within the radio access network;
a detecting unit arranged to detect when the performance measurement per user equipment of the user equipment goes beyond a resource usage threshold value per bit over a preset period of time, which the resource usage threshold value is set to indicate an over-use of the resource within the radio access network, wherein the preset period of time is set to exclude that the user equipment can have a short temporary performance dip based on movement of the user equipment; and
a reporting unit arranged to report, to a receiving communication node or within the reporting communication node, the performance measurement per user equipment when the performance measurement per user equipment goes beyond the resource usage threshold value per bit; and
an analysis unit arranged to analyze the user equipment to determine a cause for the over-use of the resource.

25. An arrangement in a receiving communication node for determining a usage of a resource in a radio access network, which receiving communication node is comprised within a radio communications network in which a user equipment is served, the arrangement comprising:
a receiving unit arranged to receive, from a reporting communication node or from within the receiving communication node, a report of a performance measurement per user equipment associated to the user equipment, which report indicates the performance measurement per user equipment in relation to a resource usage threshold value per bit, which resource usage threshold value is set to indicate an over-use by the user equipment of the resource within the radio access network, wherein the preset period of time is set to exclude that the user equipment can have a short temporary performance dip based on movement of the user equipment; and
a determining unit arranged to determine that the usage of the resource is an over-use when performance measurement per user equipment goes beyond the resource usage threshold value per bit over a preset time period and for the signal quality threshold; and
an analysis unit arranged to analyze the user equipment to determine a cause for the over-use of the resource, wherein the reporting communication node is a radio access network node, and wherein the receiving network communication node is represented by an operation and maintenance node, by a radio base station, or a radio base station controller.

\* \* \* \* \*